United States Patent Office 3,344,163
Patented Sept. 26, 1967

3,344,163
BIS-DITHIOCARBAMIC ACID ESTER
DERIVATIVES
Adolf Frank, Leverkusen, Ferdinand Grewe, Burscheid, and Helmut Kaspers, Leverkusen, Germany, assignors to Farbenfabriken Bayer Aktiengesellschaft, Leverkusen, Germany, a corporation of Germany
No Drawing. Filed Nov. 13, 1963, Ser. No. 323,258
Claims priority, application Germany, Nov. 24, 1962, F 38,388
13 Claims. (Cl. 260—455)

The present invention relates to new bis-dithiocarbamic acid ester derivatives which have a strong fungicidal activity, and to a process for their production.

It is already known that bis-dithiocarbamic acid esters which contain saturated or unsaturated hydrocarbons in the ester group possess bactericidal and fungicidal properties. (U.S. Patent No. 2,974,082.)

It is further known that the salts of bis-dithiocarbamic acids have fungacidal properties.

It has now been found that bis-dithiocarbamic acid ester derivatives of the general formula

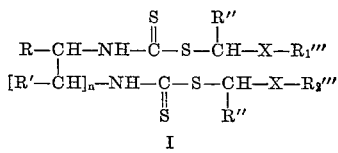

I wherein

R, R' and R'' stand for hydrogen or for alkyl, alkenyl, aryl, haloalkyl, haloalkenyl and haloaryl radicals,
$R_1'''$ and $R_2'''$ separately stand for alkyl, alkenyl, aryl, haloalkyl, haloalkenyl and haloaryl radicals,
$R_1'''$ and $R_2'''$ together stand for alkylene, haloalkylene and optically substituted arylene bridges,
X stands for oxygen and sulphur, and
n denotes a whole number between 1 and 11, have very strong fungicidal properties.

It has further been found that the bis-dithiocarbamic acid ester derivatives according to Formula I are obtained by reacting alkylene-bis-dithiocarbamic acids of the following formula

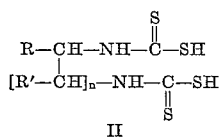

II wherein R, R' and n have the meaning given in Formula I, or their water-soluble salts with α-halogenethers of the general formula

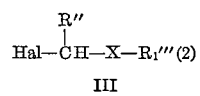

III wherein

R'' and X have the meaning given in Formula I,
Hal stands for halogen, and $R_1'''$ or $R_2'''$ stand for alkyl, alkenyl, aryl, haloalkyl, haloalkenyl and haloaryl radicals, or with bis-α-halogenethers of the general formula

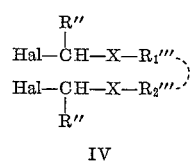

IV wherein

R'' and X have the meaning given in Formula I,
Hal stands for halogen, and
$R_1'''$ and $R_2'''$ together stand for an alkylene, haloalkyl and a possibly substituted arylene bridge.

Depending on whether the mono-halogenethers or the bis-halogenethers are used as reaction partners, about 2 or about 1 mol of this compound is used per mol of alkylene-bis-dithiocarbamic acid.

The term ether comprises also the corresponding thioethers.

It must be called definitely surprising that the compounds according to the invention possess a high activity against fungi which are often difficult to control, such as Phytophthora and Plasmopara viticola, whereas the alkylene-bis-dithiocarbamic acid esters according to U.S. Patent No. 2,974,082 are in fact completely ineffective against these phytopathogenic fungi.

It is also very surprising that the compounds according to the invention, while exceeding the activity of the metal salts of alkylene-bis-dithiocarbamic acids, can nevertheless also be applied to those cultivated plants which do not tolerate the metal salts readily or which by their application become more prone to other fungal disease. Thus, for example, it is known that the predisposition of apples and vine against genuine mildew fungi increases after the application of zinc ethylene-bis-dithiocarbamate. Such a detrimental influence on the treated plants does not occur with the substances according to the invention.

When sodium ethylene-bis-dithiocarbamate and chloromethyl ethyl ether are used as starting substances, the reaction according to the invention can be illustrated by the following scheme:

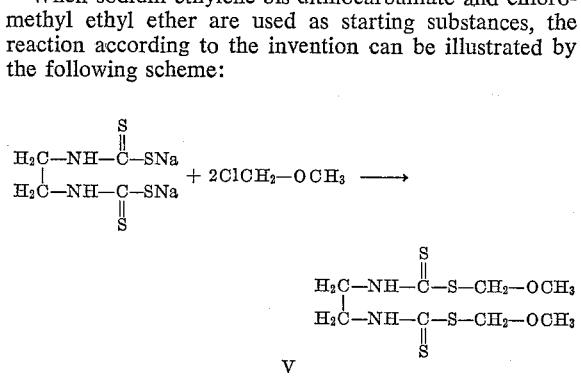

V

The alkylene-bis-dithiocarbamates used as starting substances are clearly characterized by the above Formula II.

In this formula, R and R' preferably stand for hydrogen or for alkyl, alkenyl, aralkyl, haloalkyl, haloalkenyl or haloaryl radicals with 1–6 carbon atoms. The halogenated radicals contain 1–4 halogen atoms, preferably chlorine and bromine and $n$ stands in this formula preferably for a whole number between 1 and 5.

Instead of the free dithiocarbamic acids, the water-soluble salts are expediently used. For this purpose, the alkali metal salts, especially the sodium and potassium salts, as well as the ammonium salt and the salts of amines, such as dimethylamine, are chiefly suitable.

Specific examples of alkylene-bis-dithiocarbamic acids are: ethylene-bis-dithiocarbamic acid, 1,2-propylene-bis-dithiocarbamic acid and 1,3-propylene-bis-dithiocarbamic acid.

The α-halogenethers used as reaction component for the reaction according to the invention are likewise clearly characterised by the above-mentioned Formulae III and IV. In these formulae, Hal preferably stands for chlorine and bromine. $R_2$ preferably stands for alkyl, alkenyl and aryl radicals with 1–6 carbon atoms, and also for their halogenation products. $R_1'''$ and $R_2'''$ preferably stand for alkyl and alkenyl radicals with 1–20 carbon atoms and for phenyl and naphthyl radicals. Together they preferably stand for alkylene bridges with 1–10 carbon atoms, for haloalkylene bridges with 1–10 carbon atoms and 1–4 halogen atoms, and also for phenyl and naphthyl radicals which may also be substituted by alkyl and alkoxy radicals and by halogen or nitro groups.

Specific examples of α-halogenethers are: chlorodimethyl ether, chloromethyl ethylether, chloromethylisopropyl ether, chloromethyl hexyl ether, chloromethyl hexadecyl ether, glycol-bis-chloromethyl ether, chlorodimethyl sulphide and chloromethyl phenyl-sulphide as well as chloromethyl-2,3-dichloropropyl ether and chloromethyl-2,3-dibromopropyl ether.

The reaction according to the invention is expediently carried out in the presence of solvents, such as water or mixtures of alcohol and water.

The reaction temperature can be varied within wide limits. In general, it lies between −10 and +80° C., preferably between 0 and 50° C.

The reaction according to the invention is carried out in such a manner that the reaction partners are mixed in the presence of a solvent and allowed to react within the specified temperature range. Working up is performed in usual manner.

On account of their properties, the compounds according to the invention are suitable as fungicides. They have an especially good activity against phytopathogenic fungi and have proved very effective against the following fungi: *Alternaria solani* (potatoes, tomatoes), *Phytophthora infestans* (potatoes, tomatoes), *Plasmopara viticola* (vine) and *Venturia spec.* (apples and pears).

The compounds according to the invention can be used as such or formulated in usual manner. Liquid and solid formulations are suitable which are prepared with the use of appropriate diluents, extenders, emulsifiers or dispersing agents. The active substances according to the invention can also be used together with other fungicides.

The following table illustrates the superiority of the compounds according to the invention, compared with zinc ethylene-bis-dithiocarbamate, taking *Phytophthora infestans* on tomatoes as an example.

Young tomato plants (Bonny Best variety) at the 4- 5- leaves stage are sprayed with aqueous emulsions or suspensions of the preparations at the given concentrations. When the spray liquor has dried, the plants are distributed at random in a moisture chamber, sprayed with an aqueous suspension of the zoo spores of the fungus and incubated at an atmospheric humidity of practically 100%. Evaluation takes place on the sixth day after inoculation. The degree of infestation is given in percent of the infestation of the untreated control which is set as 100.

TABLE

| Compound | Degree of infestation in percent after application of the preparations at the following concentrations | |
|---|---|---|
| | 0.025% | 0.0031% |
| $CH_2-NH-\overset{S}{\underset{\phantom{S}}{C}}-S-CH_2-O-CH_3$<br>$CH_2-NH-\underset{S}{\overset{\phantom{S}}{C}}-S-CH_2-O-CH_3$ | 9 | 33 |
| $CH_2-NH-\overset{S}{\underset{\phantom{S}}{C}}-S-CH_2-O-C_2H_5$<br>$CH_2-NH-\underset{S}{\overset{\phantom{S}}{C}}-S-CH_2-O-C_2H_5$ | 9 | 25 |
| $CH_2-NH-\overset{S}{\underset{\phantom{S}}{C}}-S-CH_2-O-C_3H_7$<br>$CH_2-NH-\underset{S}{\overset{\phantom{S}}{C}}-S-CH_2-O-C_3H_7$ | 14 | 25 |
| $CH_2-NH-\overset{S}{\underset{\phantom{S}}{C}}-S-CH_2-O-CH_3$<br>$CH-NH-\underset{S}{\overset{\phantom{S}}{C}}-S-CH_2-O-CH_3$<br>$CH_3$ | 4 | 25 |
| $CH_2-NH-\overset{S}{\underset{\phantom{S}}{C}}-S\diagdown$<br>$\phantom{CH_2-NH-C-S}Zn$<br>$CH_2-NH-\underset{S}{\overset{\phantom{S}}{C}}-S\diagup$ | 15 | 62 |
| Untreated Control | 100 | 100 |

The following examples are given for the purpose of illustrating the invention.

*Example 1*

80 g. of chlorodimethyl ether are added dropwise at 0° C. to +10° C. with good stirring to a solution of 0.5 mol of sodium ethylene-bis-dithiocarbamate in 500 ml. of water; stirring is then continued for 15 minutes. 200 ml. of methylene chloride are added, the organic layer is separated, washed with water and dried over sodium sulphate. After distilling off the solvent, 112 g. of ethylene-bis-dithiocarbamic acid-bis-methoxymethyl ester remain in the form of a yellowish green, viscous oil which solidifies very slowly. Degree of purity: 90%.

*Example 2*

100 g. of chloromethyl ethyl ether are added dropwise at +5° C. with vigorous stirring to a solution of 0.5 mol of 1,2-potassium-propylene-bis-dithiocarbamate in 700 ml. of water, and stirring is then continued for 20 minutes. After shaking out with 300 ml. of ether, the ethereal solution is washed with water, dried, and the solvent is distilled off in a vacuum. There remain 96 g. of 1,2-propylene-bis-dithiocarbamic acid ethoxymethyl ester.

*Example 3*

115 g. of chloromethyl isopropyl ether are added in small portions with good stirring to 650 ml. of a 20% aqueous solution of 1,3-ammonium-propylene-bisdithiocarbamate, cooled with ice. After 10 minutes, 200 ml. of chloroform are added to the mixture which is then further stirred for 20 minutes. The organic layer is separated, washed with water, dried and the solvent removed in a vacuum at room temperature. 108 g. of 1,3-propylene-bis-dithiocarbamic acid isopropoxymethyl ester remain as a brownish yellow oil.

Example 4

1 mol of potassium ethylene-bis-dithiocarbamate dissolved in 750 ml. of water is treated dropwise with good stirring at a temperature between 0° C. and 10° C. with 2 mol of chloromethyl hexyl ether. The mixture is further stirred for 20 minutes and then shaken out with 500 ml. of methylene chloride. After washing the methylene chloride phase with water and drying with sodium sulphate, the solvent is distilled off in a vacuum. 330 g. (75% of the theory) of ethylene-bis-dithiocarbamic acid hexyloxymethyl ester are obtained.

Example 5

24 g. of chloromethyl dodecyl ether are added dropwise at 10° C. to 0.05 mol of ammonium ethylene-bis-dithiocarbamate in 50 ml. of water. When the dropwise addition is completed, the mixture is allowed to reach room temperature and then further stirred for ½ hour. After taking up in chloroform and working up as described in Example 3, 24 g. (79% of the theory) of the ester are obtained.

Example 6

From 0.05 mol of sodium 1,2-propylene-bis-dithiocarbamate in 50 ml. of water and 0.1 mol of chloromethyl hexadecyl ether there is obtained in analogy with Example 5, 1,2-propylene-bis-dithiocarbamic acid hexadecyloxymethyl ester in a yield of 84%.

Example 7

65 g. of chloromethyl allyl ether are added dropwise at 5–10° C. with good stirring to a solution of 0.3 mol of sodium ethylene-bis-dithiocarbamate in 300 ml. of water, the pH value of the solution being maintained above 7.5 by the occasional addition of a 1% aqueous sodium hydroxide solution. The mixture is further stirred for about 15 minutes and 300 ml. of methylene chloride are added, separation then being effected. After washing with water and drying with sodium sulphate, the solvent is distilled off in a vacuum. 93 g. (88% of the theory) of ethylene-bis-dithiocarbamic acid allyloxymethyl ester are obtained with a purity degree of 85%.

Example 8

From 0.1 mol of 1,2-sodium-propylene-bis-dithiocarbamate in 100 ml. of water and 26 g. of chloromethyl-β-chloroethyl ether there are obtained according to the working method of Example 7, after distilling off the solvent in a vacuum, 35 g. of β-chloroethoxymethyl-propylene-bis-dithiocarbamate.

Example 9

A solution of 50 g. of sodium ethylene-bis-dithiocarbamate in 100 ml. of water is treated dropwise with 71 g. of α-chloromethyl-ω,ω'-dichloro-isopropyl ether, and the mixture is further stirred for 180 minutes. After working up by shaking out with chloroform, washing with water, drying, and distilling off the solvent in a vacuum, 72 g. (73% of the theory) of the corresponding ester are obtained.

Example 10

From 0.2 mol of sodium ethylene-bis-dithiocarbamate and 0.4 mol of chloromethyl octadecene-9-yl ether, there is obtained in an aqueous medium within a reaction period of 3 hours in analogy with Example 9, the corresponding ether ester in a yield of 95 g.

Example 11

300 ml. of methylene chloride are added to a solution of 92 g. of sodium ethylene-bis-dithiocarbamate in 400 ml. of water, and 100 g. of methyl-1,2-dichloroethyl ether are then added dropwise with good stirring. Stirring is continued for 1 hour, the organic layer is separated, washed with water, dried with sodium sulphate and concentrated in a vacuum. 92 g. of the ester with a purity degree of about 80% remain behind.

Example 12

0.2 mol of glycol-bis-chloromethyl ether is added dropwise at 0° C. with good stirring to 0.2 mol of ammonium ethylene-bis-dithiocarbamate in an aqueous solution, the pH value being prevented from falling below 7 by the occasional addition of a dilute sodium hydroxide solution. The resultant ester is filtered off with suction, washed with water until neutral and dried. Yield 29 g.

Example 13

A solution of 0.15 mol of potassium ethlene-bis-dithiocarbamate in 200 ml. of water is treated dropwise at 0–5° C., with good stirring, with 40 g. of chlorodimethyl sulphide, and the mixture is further stirred for 20 minutes. After shaking out with methylene chloride, washing with water, drying with sodium sulphate and distilling off the solvent in a vacuum, there remain 42 g. (85% of the theory) of ethylene-bis-dithiocarbamic acid-methylmercaptomethyl ester.

Example 14

42.5 g. of chloromethyl phenyl sulphide are added dropwise at room temperature to 0.14 mol of potassium ethylene-bis-dithiocarbamate in 200 ml. of water, and stirring is continued for 3 hours. After extraction with methylene chloride, the organic layer is washed with water and dried over sodium sulphate. After standing for some time, the ethylene-bis-dithiocarbamic acid-phenylmercaptomethyl ester separates in the form of yellow crystals. After recrystallisation from methylene chloride, the yield is 36 g. (57% of the theory); M.P. 120° C. The mother liquor contains further portions of the ester.

We claim:

1. A compound of the formula

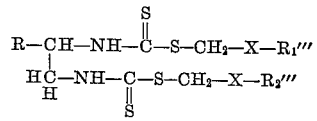

wherein R is hydrogen or lower alkyl;
$R_1'''$ and $R_2'''$ are alkyl chloroalkyl, bromoalkyl, alkenyl of 1–20 carbon atoms, phenyl or naphthyl; and
X is oxygen or sulfur.

2. A bis-dithiocarbamic acid ester derivative of claim 1 wherein $R_1'''$ and $R_2'''$ are chloroalkyl.

3. A bis-dithiocarbamic acid ester derivative of the formula

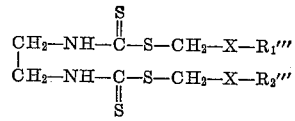

wherein
$R_1'''$ and $R_2'''$ are alkyl, chloroalkyl, and bromoalkyl; and
X is a member selected from the group consisting of oxygen and sulphur.

4. A bis-dithiocarbamic acid ester derivative of claim 3 wherein $R_1'''$ and $R_2'''$ are chloro or bromoalkyl.

5. Ethylene-bis-dithiocarbamic acid-bis-methoxymethyl ester.

6. 1,2-propylene-bis-dithiocarbamic acid ethoxymethyl ester.

7. 1,3-propylene-bis-dithiocarbamic acid isopropoxymethyl ester.

8. Ethylene-bis-dithiocarbamic acid hexyloxymethyl ester.

9. 1,2-propylene-bis-dithiocarbamic acid hexadecyloxymethyl ester.

10. β-chloroethoxymethyl - propylene - bis-dithiocarbamate.

11. Ethylene-bis-dithiocarbamic acid-methylmercaptomethyl ester.

12. Ethylene-bis-dithiocarbamic acid-phenylmercaptomethyl ester.

13. 1,2-propylene-bis-dithiocarbamic acid methoxymethyl ester.

References Cited

UNITED STATES PATENTS 2,974,082   3/1961   Collins _____ 260—455

CHARLES D. PARKER, *Primary Examiner.*

D. R. MAHANAND, D. R. PHILLIPS,
*Assistant Examiners.*